INVENTOR
ALBERT E. SMITH
BY
ATTORNEYS

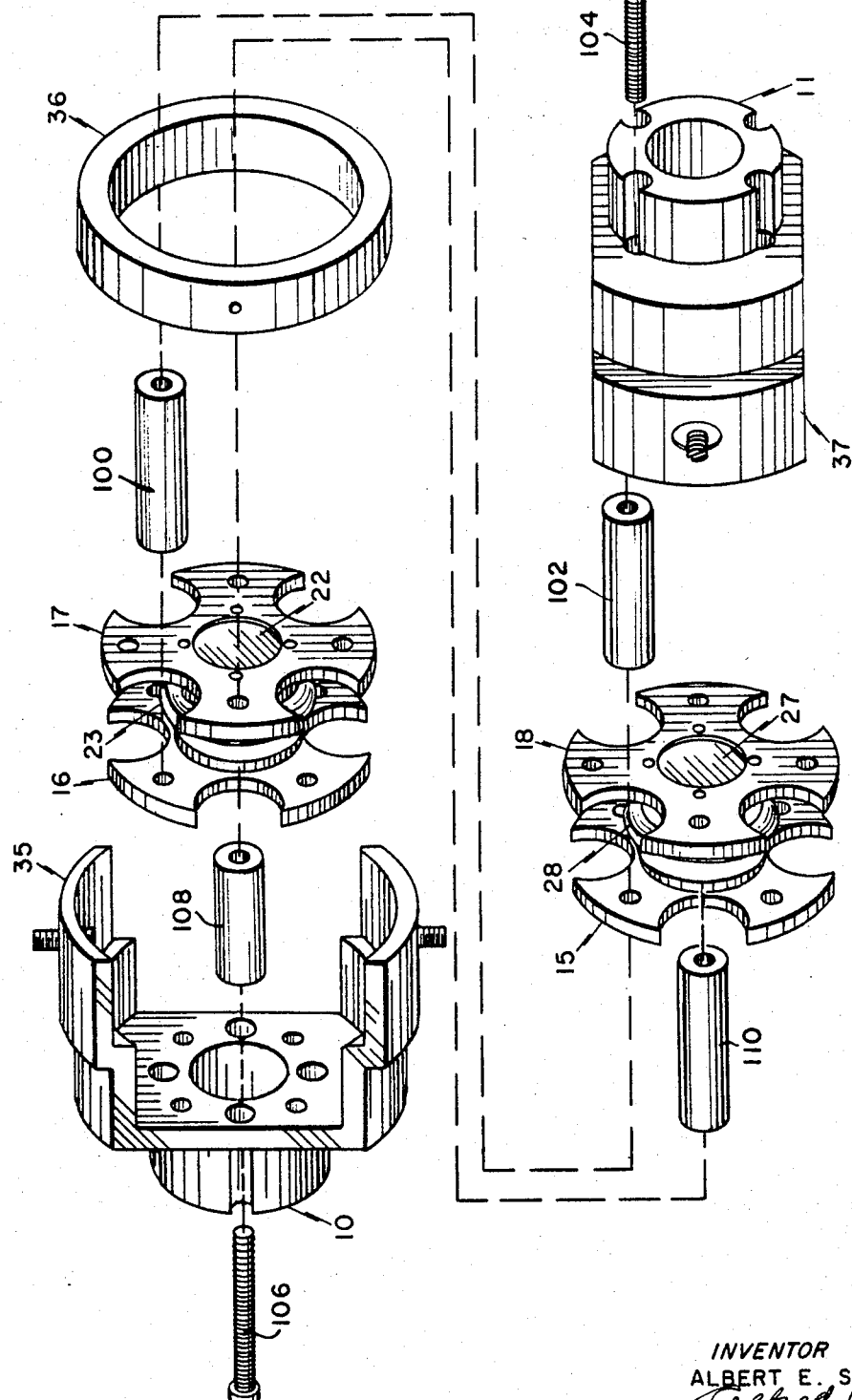

United States Patent Office 3,454,330
Patented July 8, 1969

3,454,330
COHERENT OPTICAL JOINT
Albert E. Smith, South Lancaster, Mass., assignor to Technical Operations, Incorporated, Burlington, Mass., a corporation of Delaware
Filed June 28, 1965, Ser. No. 467,670
Int. Cl. G02b 5/06, 5/14
U.S. Cl. 350—287                                                    1 Claim

ABSTRACT OF THE DISCLOSURE

This disclosure depicts a flexible joint for use in transmission lines of optical communication systems using coherent radiation beams. The illustrated optical joint comprises a pair of variable angle fluid prisms which are designed to enable the use of a relatively low index fluid.

---

In long transmission lines for coherent light, the necessity of maintaining optical alignment is crucial and nigh impossible. The need of providing some flexure in the line without loss of alignment is well recognized.

J. C. Simon and E. Spitz have proposed a flexible, fluid-filled prism. See J. Physics, (France), 24, 149, (1963). The fluid prism of Simon and Spitz required fluid with an extreme refractive index ($n=2.0$). The requirement of high refractive index severely limits the possible fluid materials so that materials with the most desirable optical qualities cannot be used. Because of this, it is questionable whether a practical prism of the Simon and Spitz design has ever been built.

Flexible couplings have also been made employing fiber optics. However, coherence is lost when fiber optics are used.

Fluid prisms, under some operating conditions, introduce two types of phase distortions. The first astigmatic distortion occurs whenever a nonplanar wave passes through a prism. The second coherence distortion arises from the dispersive effect of the prism when quasi-monochromatic light is transmitted.

Now, in accordance with the present invention, we have found a very simple mechanical arrangement for combining two flexible prisms in an optical joint to provide flexibility with minimum distortion. The prisms of the invention are fluid-filled prisms with a fluid medium having a refractive index of $n=1.5$. This refractive index permits a wide choice of fluids, so that fluids of excellent optical quality are readily obtained. The fluid chambers are free to bend in any direction, so that the system has freedom for flexure. The prism windows are optical flats which are mounted at right angles on the interior walls of the transmission line.

Thus, it is an object of the present invention to define a coherent optical joint.

It is a further object of the present invention to define a coherent optical joint using fluid prisms in which each prism window is mounted perpendicular to the axis of a portion of transmission line.

Further objects and features of the present invention will become apparent while reading the following specification together with the drawings in which:

FIG. 3 is an exploded view of an optical joint in accordance with the invention.

Figure 1:
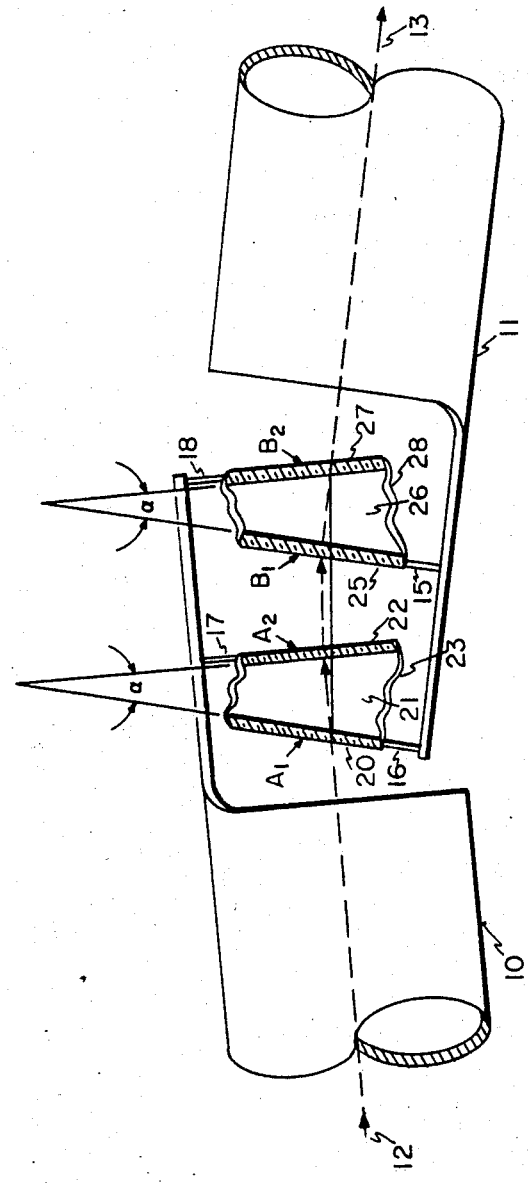
FIG. 1 is a diagrammatic illustration of an optical joint in accordance with the invention.

In FIG. 1, pipe 10 and pipe 11 are mechanical channels through which a beam of coherent light may be propagated. Pipes 10 and 11 are sections of transmission line, and it is the purpose of the invention to insure that a beam of light entering one of these sections along a path, such as path 12 in pipe 10, will track along an equivalent path in the other section, such as path 13 in pipe 11, even though there is some misalignment of the two sections. To this end, two fluid-filled prisms are arranged with respect to the two sections of transmission line in the following manner: Transparent optical flat 25 and transparent optical flat 20 are rigidly supported in the axial center of pipe 11 and at right angles to the axis of the pipe, by support 15 and support 16, respectively. Transparent optical flats 22 and 27 are similarly rigidly supported at the axial center of pipe 10 at right angles to the axis of the pipe by support 17 and support 18 respectively. The portions of pipes 10 and 11 from which the optical flats are supported are interengaged, as illustrated in FIG. 1, so that glass flat 20 is positioned inside pipe 10, beyond glass flat 22, and glass flat 25 is positioned in pipe 10, beyond glass flat 27. Glass flat 20 is coupled to glass flat 22, with flexible material 23 completely enclosing the space between flats 20 and 22. The enclosed space is filled with transparent liquid, 21. Glass flats 25 and 27 are coupled with flexible material 28 completely enclosing the space between flats 25 and 27, and the enclosed space is filled with a transparent liquid, 26.

Thus, there are two fluid-filled chambers arranged so that glass flats 20, 22, 25, and 27, are arranged in pairs, rigidly coupled to alternate mechanical channels. The glass flats, and the fluid between them, are selected for high transparency to the light which is to be propagated through the transmission line. The fluid and the flats preferably have a nominal refractive index of 1.5 at the mean temperature of operation and for the mean frequency of propagated light. For small angles of bending between the mechanical channels, each fluid-filled chamber forms a prism with vertex angle $\alpha$ equal to the mechanical angle of flexure. For small angles, the deviation of the light beam for each prism is given extremely well by $\delta=(n-1)\alpha$. Thus, for a prism medium with a refractive index of 1.5, the total deviation is just equal to the angle of flexure, and the light beam will follow the mechanical channel.

Figure 2:
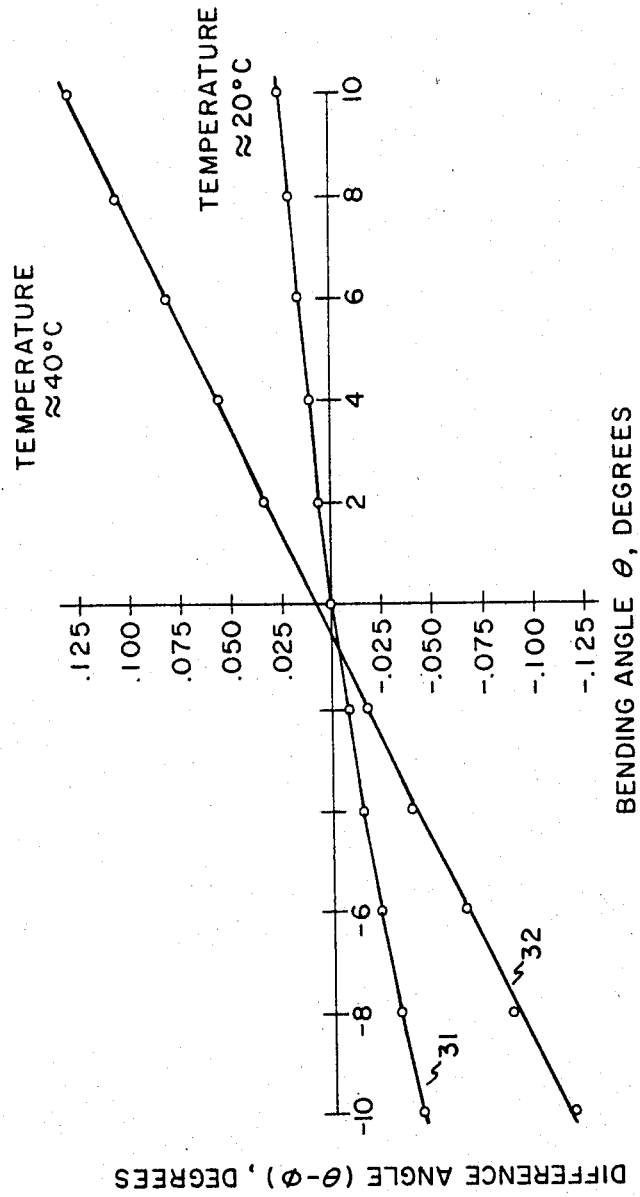
FIG. 2 is a graphical illustration showing tracking error of a beam as the inventive joint is bent.

FIG. 2 is a graphical illustration showing tracking error of a system in accordance with the invention using 6,328 angstrom radiation from a helium-neon laser. Curve 31 shows the tracking error with the temperature at about 20% centigrade, and curve 32 shows the tracking error with the temperature at about 40% centigrade.

The difference angle, plotted with respect to the vertical axis of the graph, is defined as the difference between the angle of joint flexure and the angle of deviation of the beam.

The slopes of the curves shown is called the tracking error for the specified temperature. The joint used for the graph of FIG. 2, operated at a temperature of 10% centigrade, would exhibit virtually no tracking error at the 6,328 angstrom wave length.

FIG. 3 illustrates a specific embodiment of the invention that has been built, and which was used to obtain the graph of FIG. 2. In FIG. 3, identical numbers are used to illustrate the equivalent parts with respect to the diagrammatic illustration of FIG. 1. Thus, mechanical channels, or pipes 10 and 11, are arranged to be interengaged, as described with respect to FIG. 1.

As illustrated in FIG. 3, each of supports 16, 17, 15, and 18 are adapted for mounting connections at four points. For simplicity of illustration in the exploded view of FIG. 3, only one mounting bushing is shown for a single connection to each plate. In the complete device, 16 bushings and 8 mounting bolts are used in the assembly. In FIG. 3 the supports 16 and 17 holding the optical flats 20 and 22 defining the transparent walls of one of the fluid-filled prisms and supports 15 and 18 holding optical flats 25 and 27 defining the transparent walls of the second fluid-filled prism correspond to the supports 16, 17, 15, and 18 in the schematic FIG. 1 illustration. Whereas in FIG. 1 the supports 15 and 16 are shown attached directly to the pipe 11 as a functional illustration of the support provided by the pipe for the supports 15 and 16, in the structural implementation shown in FIG. 3, the supports 15 and 16 are anchored to the pipe 11 by two sets of four bushings and four bolts, one set of four bushings (one of which is shown at 100) acting to space support 16 from support 15, and the other set of four bushings (one of which is shown at 102) acting to space support 15 from pipe 11. Four bolts (one of which is shown at 104) locks the supports 16 and 15, spaced by the bushings 100 and 102 to the pipe 11. Thus, any movement of pipe 11 is transmitted through the first set of bushings 102 to the support 15 and through the second set of bushings 100 to the support 16.

Similarly, supports 17 and 18 are anchored to pipe 11 by means of two sets of four bushings (eight in all) and four bolts (one of which is shown at 106). The first set of bushings (one of which is shown at 108) spaces the support 17 from the pipe 10. The second set of bushings (one of which is shown at 110) spaces the support 17 from the support 18. The bolts 106 lock the supports 17 and 18 to the pipe 10 such that any movemnt of the pipe is transmitted fixedly to the supports 17 and 18 to vary the effective angle of the prisms formed between the supports 16 and 17 and between the supports 15 and 18, respectively. Gimbal ring 36 is mounted at two points, by ball bearings, to flanges 35 of pipe 10, and is likewise mounted at two points, by ball bearings, to flanges 37 of pipe 11. This gimbal mounting provides mechanical rigidity against lateral and longitudinal displacement, while permitting freedom of flexure in two orthogonally related directions.

In this embodiment, the flexible material 23 and 28 joining the optical flats to form prisms is plastic bellows made of synthetic rubber. The fluid used is a silicone oil, available as Dow Corning Silicone Fluid #550, from the Dow Corning Corporation, and has a nominal refractive index of 1.5 for the D line of sodium light at room temperature.

The glass used for the optical flats was optical glass having a refractive index substantially the same as that of the fluid. While the given embodiment has been operated successfully with uncoated glass flats, it is preferable to use antireflection coatings as is conventional for the glass-air interfaces.

The device, constructed in accordance to FIG. 3, exhibited no mechanical backlash in testing. For small angles (<10°), of flexure, any tracking error was completely accounted for by a refractive index slightly different than the 1.5 value.

A nonplanar wave front, passing through the flexible coupling, is astigmatically distorted. This distortion is seen by placing a lens in the beam emerging from the coupling, with its axis parallel to the direction of transmitted light, and then observing the Fraunhofer patterns at the focus of the lens.

Using diffraction patterns produced by radiation from a helium-neon gas laser, the astigmatic distortion produced from a 9 mm. diameter beam showed approximately a total deviation of 2 wavelengths over the aperture from a perfect plane wave input.

Using a high pressure mercury arc, filtered to give approximately 88 angstroms spectral width at 5,400 angstroms, the dispersive effect of the prism fluid caused distortion. This distortion is evident in Fraunhofer patterns, and is in the same direction as the direction of flexure, resulting from a decrease in beam coherence as the coupling is flexed. Replacing the mercury-arc source with a helium-neon laser having spectral width of less than 1 angstrom, undistorted diffraction patterns were produced for all angles of flexure attainable with this coupling.

While the invention has been described in relation to a specific embodiment, various modifications thereof will be apparent to those skilled in the art and it is intended to cover the invention broadly within the spirit and scope of the appended claims.

I claim:
1. A flexible coupling for an optical conduit comprising:
 (a) a first conduit section;
 (b) first mounting means for rigidly mounting first and second optical flats to said first conduit section perpendicular to the axis of said first section, said first mounting means comprising first and second mounting plates supporting said optical flats and first cantilever pinning means for pinning said plates in spaced relationship to said first conduit section with said plates perpendicular to the axis of said first conduit section, said first pinning means comprising a first pair of diametrically opposed rod means anchoring said first and second plates to each other and to said first conduit section;
 (c) a second conduit section;
 (d) second mounting means for rigidly mounting third and fourth optical flats to said second conduit section perpendicular to the axis of said second conduit section, said second mounting means comprising third and fourth mounting plates supporting each of said optical flats and second cantilever pinning means for pinning said plates in spaced relationship to said second conduit section with said plates perpendicular to the axis of said second conduit section, said second pinning means comprising a second pair of diametrically opposed rod means anchoring said third and fourth plates to each other and to said second conduit section, said first and second pairs of rod means being angularly offset by 90° to provide for flexure of said coupling in two orthogonally related planes;
 (e) flexible bellows means coupling said mounting plates supporting said first and fourth optical flats to completely enclose a space therebetween;
 (f) flexible bellows means coupling said mounting plates supporting said second and third optical flats to completely enclose a space therebetween; and
 (g) a fluid having a nominal refractive index of 1.5 filling each of said spaces.

References Cited
UNITED STATES PATENTS 3,012,463  12/1961  Krivit _____ 350—287
3,295,913  1/1967   Walther _____ 350—179

FOREIGN PATENTS 1,334,523  12/1962  France.

JOHN K. CORBIN, *Primary Examiner.*

M. TOKAR, *Assistant Examiner.*